(12) United States Patent
Huang et al.

(10) Patent No.: US 11,480,307 B2
(45) Date of Patent: Oct. 25, 2022

(54) DOWNLIGHT APPARATUS

(71) Applicant: XIAMEN ECO LIGHTING CO. LTD., Xiamen (CN)

(72) Inventors: Zhenkun Huang, Xiamen (CN); Yongzhe Dong, Xiamen (CN); Xiaoliang Wen, Xiamen (CN); Shouqiang Hou, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 16/797,826

(22) Filed: Feb. 21, 2020

(65) Prior Publication Data

US 2020/0271281 A1    Aug. 27, 2020

(30) Foreign Application Priority Data

Feb. 22, 2019   (CN) .......................... 201920233364.2

(51) Int. Cl.
*F21K 9/61*   (2016.01)
*F21V 21/03*  (2006.01)
*F21V 29/70*  (2015.01)

(52) U.S. Cl.
CPC ................ *F21K 9/61* (2016.08); *F21V 21/03* (2013.01); *F21V 29/70* (2015.01)

(58) Field of Classification Search
CPC . F21K 9/61; F21V 21/03; F21V 29/70; F21V 23/007; G02B 6/0036; G02B 6/0085; F21Y 2103/33; F21Y 2115/10; F21S 8/026

See application file for complete search history.

(56) References Cited

U.S. PATENT DOCUMENTS

| D342,799   | S  | * | 12/1993 | Ham ............................... D26/26 |
| 2011/0242821 | A1 | * | 10/2011 | Pan ....................... G02B 6/0038 362/345 |
| 2014/0003061 | A1 | * | 1/2014 | Chen ....................... F21V 21/30 362/311.02 |
| 2014/0192558 | A1 | * | 7/2014 | Dau .......................... F21V 7/00 362/612 |
| 2016/0018093 | A1 | * | 1/2016 | Van Winkle ............ F21V 23/06 362/295 |
| 2016/0116666 | A1 | * | 4/2016 | Sato ..................... G02B 6/0046 362/509 |
| 2017/0015435 | A1 | * | 1/2017 | Jha ......................... B64D 47/02 |
| 2017/0108638 | A1 | * | 4/2017 | Teragawa ............. G02B 6/0085 |
| 2017/0303357 | A1 | * | 10/2017 | Miller ..................... A61B 90/35 |

(Continued)

FOREIGN PATENT DOCUMENTS

CN        207661588 U   *   7/2018   .............. F21S 8/026

OTHER PUBLICATIONS

Machine English Translation of CN207661588U; Huang Zhenkun (Year: 2018).*

*Primary Examiner* — Rajarshi Chakraborty
*Assistant Examiner* — Glenn D Zimmerman
(74) *Attorney, Agent, or Firm* — Chun-Ming Shih; Lanway IPR Services

(57) ABSTRACT

A downlight apparatus includes a heat dissipation unit, a light source, a driver module, a light guiding module, a light guiding unit and a protruding portion. The protruding portion has a top portion and an enlarging portion. The top portion is attached to the heat dissipation unit and has a smaller diameter than the enlarging portion.

10 Claims, 8 Drawing Sheets

(56) References Cited

U.S. PATENT DOCUMENTS

2017/0351143 A1* 12/2017 Kadowaki ............ G02B 6/0068
2018/0128434 A1*  5/2018 Moon ..................... F21S 8/04
2019/0178453 A1*  6/2019 Zeng ..................... F21V 29/717

* cited by examiner

DOWNLIGHT APPARATUS

FIELD

The present invention is related to a downlight apparatus and more particularly related to a downlight apparatus with a diffusion cover.

BACKGROUND

Lighting or illumination is the deliberate use of light to achieve a practical or aesthetic effect. Lighting includes the use of both artificial light sources like lamps and light fixtures, as well as natural illumination by capturing daylight. Daylighting (using windows, skylights, or light shelves) is sometimes used as the main source of light during daytime in buildings. This can save energy in place of using artificial lighting, which represents a major component of energy consumption in buildings. Proper lighting can enhance task performance, improve the appearance of an area, or have positive psychological effects on occupants.

Indoor lighting is usually accomplished using light fixtures, and is a key part of interior design. Lighting can also be an intrinsic component of landscape projects.

A light-emitting diode (LED) is a semiconductor light source that emits light when current flows through it. Electrons in the semiconductor recombine with electron holes, releasing energy in the form of photons. This effect is called electroluminescence. The color of the light (corresponding to the energy of the photons) is determined by the energy required for electrons to cross the band gap of the semiconductor. White light is obtained by using multiple semiconductors or a layer of light-emitting phosphor on the semiconductor device. Appearing as practical electronic components in 1962, the earliest LEDs emitted low-intensity infrared light. Infrared LEDs are used in remote-control circuits, such as those used with a wide variety of consumer electronics. The first visible-light LEDs were of low intensity and limited to red. Modern LEDs are available across the visible, ultraviolet, and infrared wavelengths, with high light output.

Early LEDs were often used as indicator lamps, replacing small incandescent bulbs, and in seven-segment displays. Recent developments have produced white-light LEDs suitable for room lighting. LEDs have led to new displays and sensors, while their high switching rates are useful in advanced communications technology.

LEDs have many advantages over incandescent light sources, including lower energy consumption, longer lifetime, improved physical robustness, smaller size, and faster switching. Light-emitting diodes are used in applications as diverse as aviation lighting, automotive headlamps, advertising, general lighting, traffic signals, camera flashes, lighted wallpaper and medical devices.

Unlike a laser, the color of light emitted from an LED is neither coherent nor monochromatic, but the spectrum is narrow with respect to human vision, and functionally monochromatic.

The energy efficiency of electric lighting has increased radically since the first demonstration of arc lamps and the incandescent light bulb of the 19th century. Modern electric light sources come in a profusion of types and sizes adapted to many applications. Most modern electric lighting is powered by centrally generated electric power, but lighting may also be powered by mobile or standby electric generators or battery systems. Battery-powered light is often reserved for when and where stationary lights fail, often in the form of flashlights, electric lanterns, and in vehicles.

Although lighting devices are widely used, there are still lots of opportunity and benefit to improve the lighting devices to provide more convenient, low cost, reliable and beautiful lighting devices for enhancing human life.

SUMMARY

In some embodiments, a downlight apparatus includes a heat dissipation unit, a light source module, a driver module, a protruding portion. The heat dissipation unit has a first diameter. The light source module has a plurality of LED chips. The light source module is connected to the heat dissipation unit for the heat dissipation unit carrying away heat of the light source module.

The driver module converts an indoor power to a driving power supplying to the light source module. The light guiding unit receives a light of the light source module and changes light paths of the light. For example, an output light originally emitted from the LED chips is mainly facing to a direction. The light guiding unit changes transmitting paths of the output light, including narrowing the path to form a smaller light beam or widening the path to form a diffusion light.

The protruding portion has a top portion and an enlarging portion. The top portion has a second diameter matching the first diameter and attached to the heat dissipation unit. The enlarging portion has a third diameter larger than the first diameter and the second diameter.

In other words, there is a side for connecting to the protruding portion. The protruding portion has a portion with a larger diameter than the connecting side of the heat dissipation unit connecting to the protruding portion.

In some embodiments, the light guiding unit is a light guiding having a lateral side, a front side and a back side. The light is emitted from the light source module enters the lateral side of the light guiding plate and exists from the front side of the light guiding and then enters the protruding portion.

For example, such light guiding plate is a round disk shape or a rectangular plate. There are multiple microdots formed on a front side of the light guiding plate. When light is emitted from a lateral side of such light guiding plate, light escapes from the microdots on the front side.

In some embodiments, the light source module has a belt. The plurality of LED chips are disposed on the belt, the belt transmits heat of the plurality of LED chips to the heat dissipation unit.

In some embodiments, there is an elastic buffer between the belt and the heat dissipation unit so that when the light guiding is expanded due to thermal expansion, there is a buffer space protecting the light guiding and the LED chips.

In some embodiments, the protruding portion has a light diffusion surface for rendering a diffused output light.

In some embodiments, the light guiding unit is a lens module for guiding the light of the plurality of LED chips evenly to the protruding portion.

In some embodiments, the plurality of LED chips have multiple sets with different tilt angles of light output so as to emit the light to different sections of the protruding portion.

In some embodiments, a first set of the plurality of LED chips emitting light to a peripheral area of the protruding portion has less LED chips than a second set of the plurality of LED chips emitting light to a central area of the protruding portion.

In some embodiments, the heat dissipation unit has an inner side wall. The light source module is attached to the inner side wall of the heat dissipation unit.

In some embodiments, the heat dissipation unit has a back plate and the driver module is disposed on the back plate.

In some embodiments, the driver module has a metal box engaging the back plate of the heat dissipation unit.

In some embodiments, the back cover has a vertical bar. The metal box has a guiding groove. The vertical bar is inserted into the guiding groove while installing the back cover to the metal box.

In some embodiments, the vertical bar has an elastic hook corresponding to a position structure of the guiding groove so that when the elastic hook is inserted to the position structure, there is an elastic force for firmly engaging the metal box to the back plate of the heat dissipation unit.

For example, there are two vertical bars extending upwardly relative to the back cover of the heat dissipation unit. The box has two guiding grooves. The two vertical bars are inserted into the two guiding grooves respectively. When the two vertical bars reaches to end of the guiding grooves, the elastic hook is deformed to pass the position structure and then hooked to the position structure to fix to the heat dissipation unit.

In some embodiments, the protruding portion has a curve side profile with a middle portion having a largest diameter than a top portion and a bottom portion.

In some embodiments, the light guiding unit and the protruding portion are made together as a unit body. The light guiding unit has a plurality of lens sets for guiding the light of the light source even to the protruding portion and the protruding portion has a diffusion surface.

In some embodiments, the protruding portion has a first part of a first geometric shape and a second part of a second geometric shape. The second part is connected to the heat dissipation unit. The second geometric shape has a different geometric shape as the first geometric shape. For example, the heat dissipation unit may have a circular connecting side for the protruding portion. The protruding portion may have a square enlarging portion concealing the smaller circular connecting side. In other words, when such downlight apparatus is installed, users see a square shape light instead of a circular shape light.

In some embodiments, the plurality of LED chips have a first set of first color temperature and a second set of a second color temperature. The driver module controls the plurality of LED chips to generate mixed lights of different color temperatures.

In some embodiments, the heat dissipation unit is installed to a downlight installation cavity. For example, it is common to dig an installation cavity on a ceiling for installing a downlight device.

In some embodiments, the heat dissipation unit has two elastic structure for fixing the downlight apparatus in the installation cavity.

In some embodiments, the protruding portion conceals the installation cavity.

DETAILED DESCRIPTION

Figure 10A:
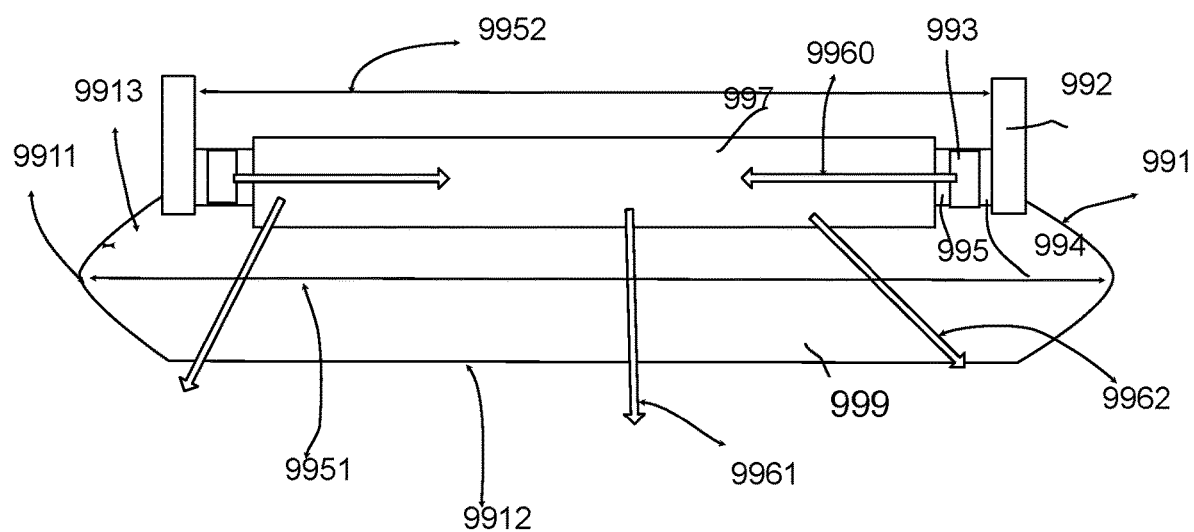
FIG. 10A shows a downlight apparatus structure.
Figure 10B:
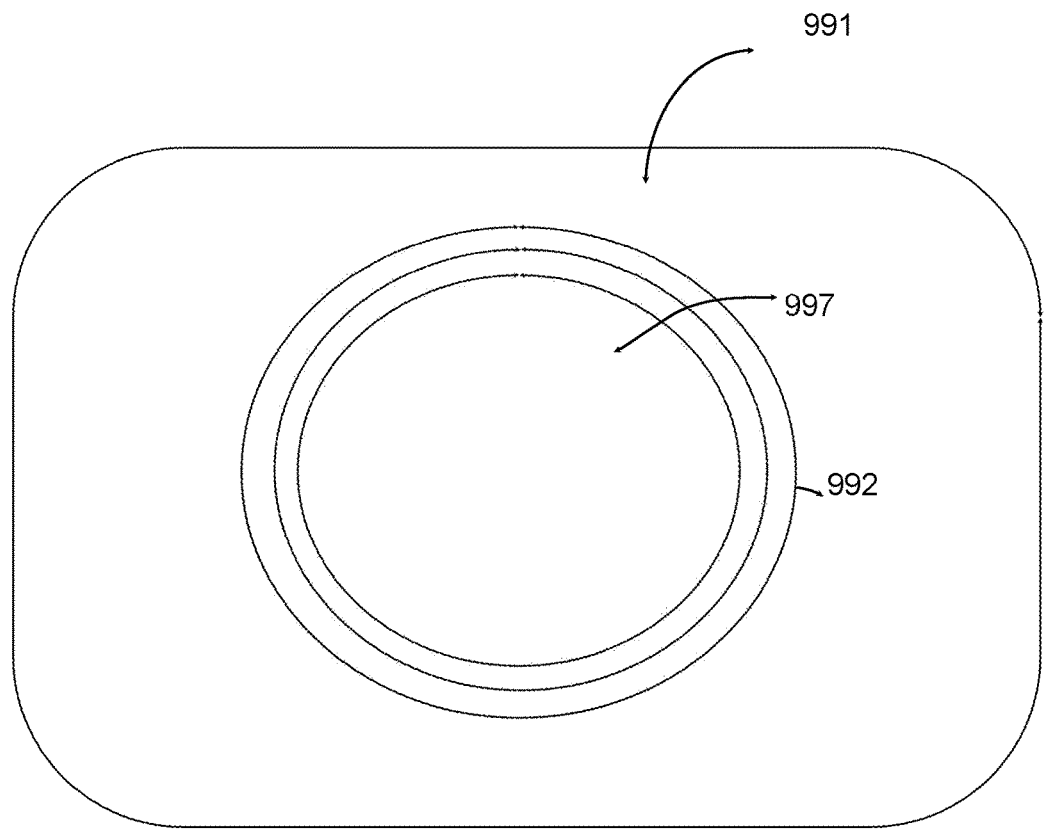
FIG. 10B shows another view of the example of FIG. 10A.

Please refer to FIG. 10A and FIG. 10B, a downlight apparatus includes a heat dissipation unit 992, a light source module 993, a protruding portion 999. The heat dissipation unit 992 has a first diameter 9952. The light source module 993 has a plurality of LED chips. The light source module 993 is connected to the heat dissipation unit 992 for the heat dissipation unit carrying away heat of the light source module 993.

The light emitted from the light source module 993 is guided by the light guiding unit 997 to different directions 9960, 9961, 9962 toward the protruding portion 999. The protruding portion 999 has a top portion 9913, an enlarging portion 9911 and a bottom portion 9912. The enlarging portion 9911 has a larger diameter 9952 than the diameter 9951 of the top portion 9913 which is connected to the heat dissipation unit 992.

The light source module 993 is kept with a fixed distance 995 to the light guiding unit 997. In addition, there is a buffer 994, e.g. an elastic platform or foam, between the light source module 993 and the heat dissipation unit 992.

Please refer to FIG. 10B, the geometric shape of the protruding portion 991 may be a rectangular shape while the connecting side of the heat dissipation unit 992 is circular.

In FIG. 10B, the light guiding unit 997 has a similar geometric shape as the connecting side of the heat dissipation unit 992, but this is not a necessary limitation.

Figure 11:
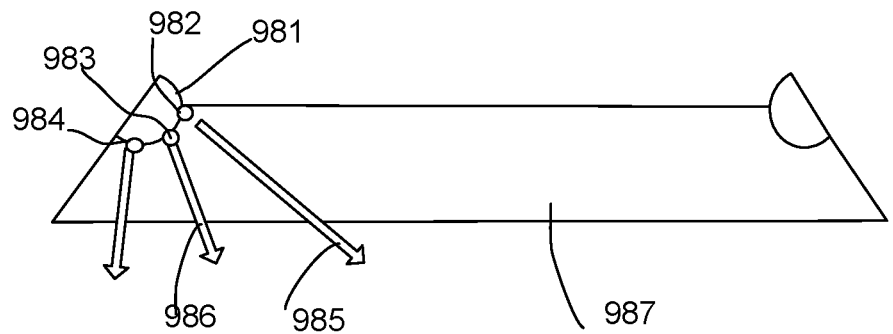
FIG. 11 shows another embodiment.

Please refer to FIG. 11, which shows another embodiment. In FIG. 11, the light source module 981 has multiple sets 982, 983, 984 of LED chips emitting lights to different sections 986, 985 of the protruding portion 987. In FIG. 11, there is no light guiding unit. In other words, this is another embodiment type. The number of different sets may be different to achieve an even visual effect.

Figure 12:
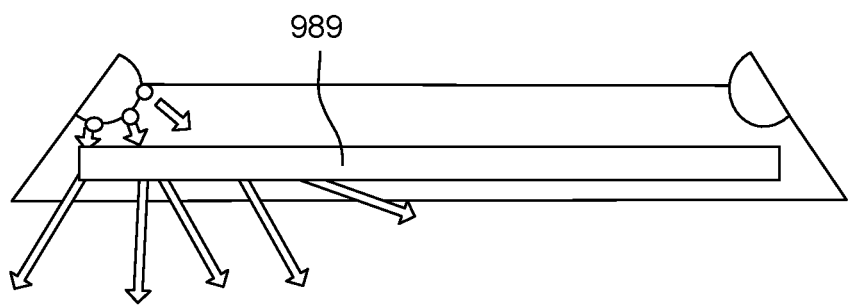
FIG. 12 shows another embodiment.

Please refer to FIG. 12, unlike FIG. 11, the embodiment has a light guiding unit 989 for changing light paths.

Figure 13:
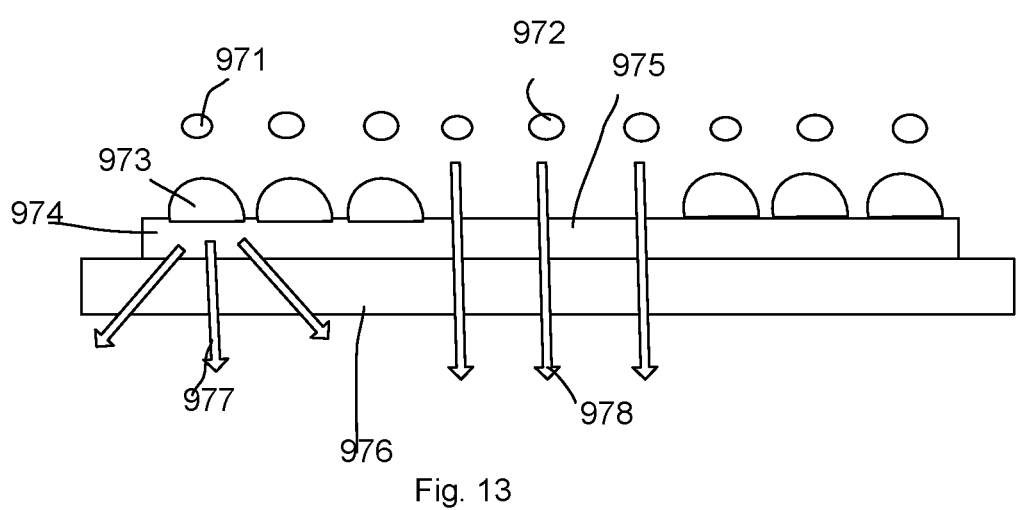
FIG. 13 shows another embodiment.

Please refer to FIG. 13, which shows another embodiment. In FIG. 13, there are three sets of LED chips, e.g. 971 and 972.

The LED chips 971 in a peripheral area emits light to a lens module 973 of a light guiding unit 974 for changing light paths 977. In contrast, the light emitted from LED chips 972 in the middle area is passing to a middle portion 975 with no light path changing function straightly 978 toward the protruding portion 976.

The driver module converts an indoor power to a driving power supplying to the light source module. The light guiding unit receives a light of the light source module and changes light paths of the light. For example, an output light originally emitted from the LED chips is mainly facing to a direction. The light guiding unit changes transmitting paths of the output light, including narrowing the path to form a smaller light beam or widening the path to form a diffusion light.

The protruding portion has a top portion and an enlarging portion. The top portion has a second diameter matching the first diameter and attached to the heat dissipation unit. The enlarging portion has a third diameter larger than the first diameter and the second diameter.

In other words, there is a side for connecting to the protruding portion. The protruding portion has a portion with a larger diameter than the connecting side of the heat dissipation unit connecting to the protruding portion.

In some embodiments, the light guiding unit is a light guiding having a lateral side, a front side and a back side. The light is emitted from the light source module enters the lateral side of the light guiding plate and exists from the front side of the light guiding and then enters the protruding portion.

For example, such light guiding plate is a round disk shape or a rectangular plate. There are multiple microdots formed on a front side of the light guiding plate. When light is emitted from a lateral side of such light guiding plate, light escapes from the microdots on the front side.

In some embodiments, the light source module has a belt. The plurality of LED chips are disposed on the belt, the belt transmits heat of the plurality of LED chips to the heat dissipation unit.

In some embodiments, there is an elastic buffer between the belt and the heat dissipation unit so that when the light guiding is expanded due to thermal expansion, there is a buffer space protecting the light guiding and the LED chips.

In some embodiments, the protruding portion has a light diffusion surface for rendering a diffused output light.

In some embodiments, the light guiding unit is a lens module for guiding the light of the plurality of LED chips evenly to the protruding portion.

In some embodiments, the plurality of LED chips have multiple sets with different tilt angles of light output so as to emit the light to different sections of the protruding portion.

In some embodiments, a first set of the plurality of LED chips emitting light to a peripheral area of the protruding portion has less LED chips than a second set of the plurality of LED chips emitting light to a central area of the protruding portion.

In some embodiments, the heat dissipation unit has an inner side wall. The light source module is attached to the inner side wall of the heat dissipation unit.

In some embodiments, the heat dissipation unit has a back plate and the driver module is disposed on the back plate.

In some embodiments, the driver module has a metal box engaging the back plate of the heat dissipation unit.

In some embodiments, the back cover has a vertical bar. The metal box has a guiding groove. The vertical bar is inserted into the guiding groove while installing the back cover to the metal box.

In some embodiments, the vertical bar has an elastic hook corresponding to a position structure of the guiding groove so that when the elastic hook is inserted to the position structure, there is an elastic force for firmly engaging the metal box to the back plate of the heat dissipation unit.

For example, there are two vertical bars extending upwardly relative to the back cover of the heat dissipation unit. The box has two guiding grooves. The two vertical bars are inserted into the two guiding grooves respectively. When the two vertical bars reaches to end of the guiding grooves, the elastic hook is deformed to pass the position structure and then hooked to the position structure to fix to the heat dissipation unit.

In some embodiments, the protruding portion has a curve side profile with a middle portion having a largest diameter than a top portion and a bottom portion.

In some embodiments, the light guiding unit and the protruding portion are made together as a unit body. The light guiding unit has a plurality of lens sets for guiding the light of the light source even to the protruding portion and the protruding portion has a diffusion surface.

In some embodiments, the protruding portion has a first part of a first geometric shape and a second part of a second geometric shape. The second part is connected to the heat dissipation unit. The second geometric shape has a different geometric shape as the first geometric shape. For example, the heat dissipation unit may have a circular connecting side for the protruding portion. The protruding portion may have a square enlarging portion concealing the smaller circular connecting side. In other words, when such downlight apparatus is installed, users see a square shape light instead of a circular shape light.

In some embodiments, the plurality of LED chips have a first set of first color temperature and a second set of a second color temperature. The driver module controls the plurality of LED chips to generate mixed lights of different color temperatures.

In some embodiments, the heat dissipation unit is installed to a downlight installation cavity. For example, it is common to dig an installation cavity on a ceiling for installing a downlight device.

In some embodiments, the heat dissipation unit has two elastic structure for fixing the downlight apparatus in the installation cavity.

In some embodiments, the protruding portion conceals the installation cavity.

Reference may now be made in detail to particular embodiments of the disclosure, examples of which are illustrated in a plurality of accompanying drawings. While the disclosure may be described in conjunction with the preferred embodiments, it may be understood that they are not intended to the limit the disclosure to these embodiments. On the contrary, the disclosure is intended to cover alternatives, modifications and equivalents that may be included within the spirit and scope of the disclosure as defined by the appended claims. Furthermore, in the following detailed description of the present disclosure, numerous specific details are set forth in order to provide a thorough understanding of the present disclosure. However, it may be readily apparent to one skilled in the art that the present disclosure may be practiced without these specific details.

Please refer to FIGS. 1 to 5, in some embodiments, a type of a lighting apparatus includes a light passing shell 10, a heat dissipation unit 20, a reflection unit 30, a light guiding unit 40, a light source module 50 and a driver module 60. The lighting apparatus via the connection supplies indoor electricity power, the switch is turned on and driver module 60 works, in order to supply electrical power to light source module 50. The light source module 50 guides the light out through light guiding unit 40, and then transmit the uniform light via the light passing shell 10 to play the role of illumination.

Among them, the light passing shell 10 includes a ring portion 11 and a protruding portion 12 which is an unibody structure connected to an end of one end of ring portion 11. The heat dissipation unit 20 is a detachable connection to the ring portion 11 at a part far from the protruding portion 12. The reflection unit 30 and the light guiding unit 40 are both installed on ring portion 11, and the light guiding unit 40 is disposed as a stacked arrangement on the side of the reflection unit 30 near the protruding portion 12. By the moment, the reflection unit 30 and the light guiding unit 40 are situated between the heat dissipation unit 20 and the light passing shell 10. The light source module 50 is surrounded on the inner side wall of the heat dissipation unit 20 and is opposite to the side of the reflection unit 30 and the light guiding unit 40. The driver module 60 is installed on one side of the heat dissipation unit 20 far from the protruding portion 12, electrically connected between driver module 60 and light source module 50 may drive the light source module 50 to emit light. In an embodiment, the lighting is implemented by the light of the light source module 50, guiding the light out via the light guiding unit 40, and then make the light emit toward the light passing shell 10 via the illuminator. The light passing shell 10 transmit the light eventually through the diffusion and the light passing characteristic to implement the role of the lighting.

In an embodiment, the light passing shell 10 is provided as an unibody structure including the ring portion 11 and the protruding portion 12. The heat dissipation unit 20, the reflection unit 30, the light guiding unit 40, the light source module 50 are all disposed on the light passing shell 10 which the entire exterior surface of the lighting apparatus may be illuminated. The angle of beaming is increased, the useful occasion is increased, and the user experience is improved.

In some embodiments, the protruding portion 12 protrudes toward the side far from the ring portion 11, and its cross section may be curve shape. The ring portion 11 may be a ring shape, the reflection unit 30 is a circular disk and light guiding unit 40 is discoidal. The shapes of the ring portion 11, the protruding portion 12, the reflection unit 30 and the light guiding unit 40 may not be limited to this.

The material of the light guiding unit 40 may be PMMA (Polymethyl Methacrylate), PC (Polycarbonate) or PS (Polystyrene) etc. A silk dot printing and a laser dotting of its surface may be the role of light guiding, among them, the surface with dots is close to one side of reflection unit 30.

Preferably, the height of light passing shell 10 should not be more than 29 mm, which means the distance between the top of the ring portion 11 of the light passing shell 10, and the bottom of protruding portion 12 should not be more than 29 mm. So as to achieve ultra-thin design but also has a better appearance and reduce the cost.

Figure 5:
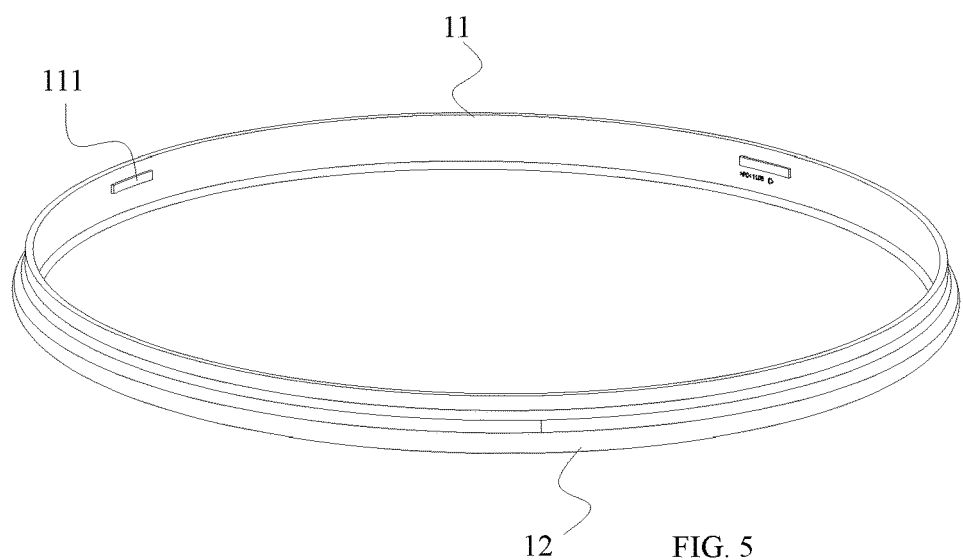
FIG. 5 is another view of the embodiment of FIG. 2.
Figure 6:
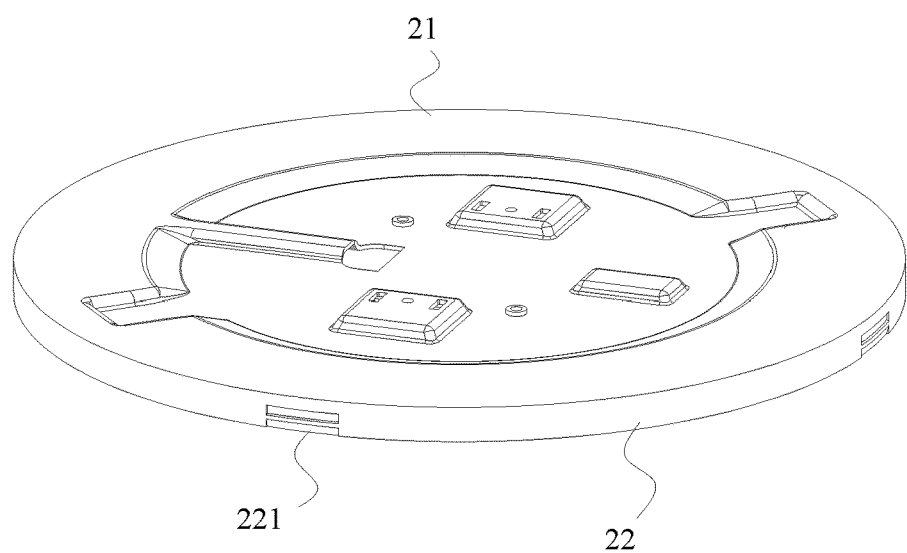
FIG. 6 shows a back cover of a heat dissipation unit.

Please refer to FIGS. 5 and 6 in an embodiment, in order to implement the detachable connection between the light passing shell 10 and the heat dissipation unit 20, a clip 111 is on the inner wall of the ring portion 11. In addition, a clip groove 221 is on the outer wall of the heat dissipation unit 20 which fit in with a clip 111. Specifically, the heat dissipation unit 20 includes a horizontal part 21 and a vertical part 22, which is connected to one side of the horizontal part 21. Among them, the horizontal part 21 may be a plate shape and the vertical part 22 is ring shape. The clip groove 221 is on the outer side wall of the vertical part 22, which is matched with the clip 111.

In an embodiment, the horizontal part 21 and the vertical part 22 are unibody structure, in order to simplify the structure and reduce the cost. In an embodiment, the clip 111 correspond to the clip groove 221 one by one. The clip 111 is arranged evenly along circular peripheral direction of the ring shape, the clip groove 221 is arranged evenly along the circular peripheral direction of the vertical part 22. The amount of the clip 111 and the clip groove 221 may be selected according to the actual situation. In some embodiments, the clip groove 221 may also be on the inner side wall of the ring portion 11, accordingly, the clip 111 may be on the outer side wall of the vertical part 22 in the heat dissipation unit 20, which fit in with the clip groove 221.

Figure 1:
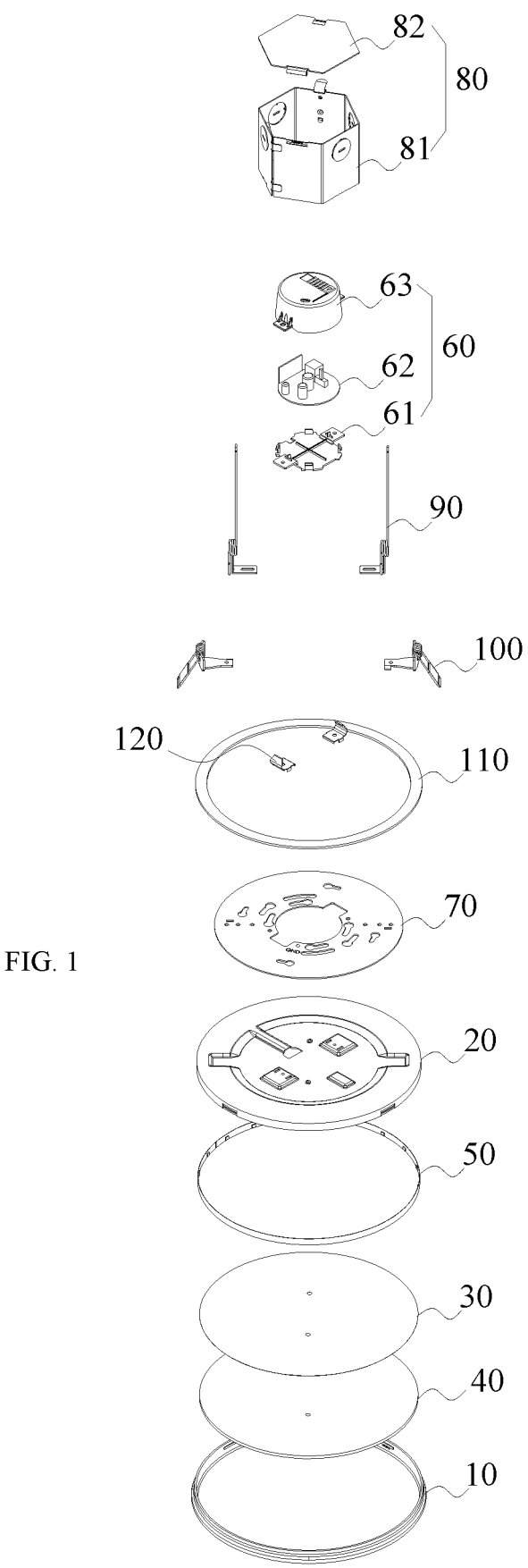
FIG. 1 is an exploded diagram of a downlight apparatus embodiment.
Figure 2:
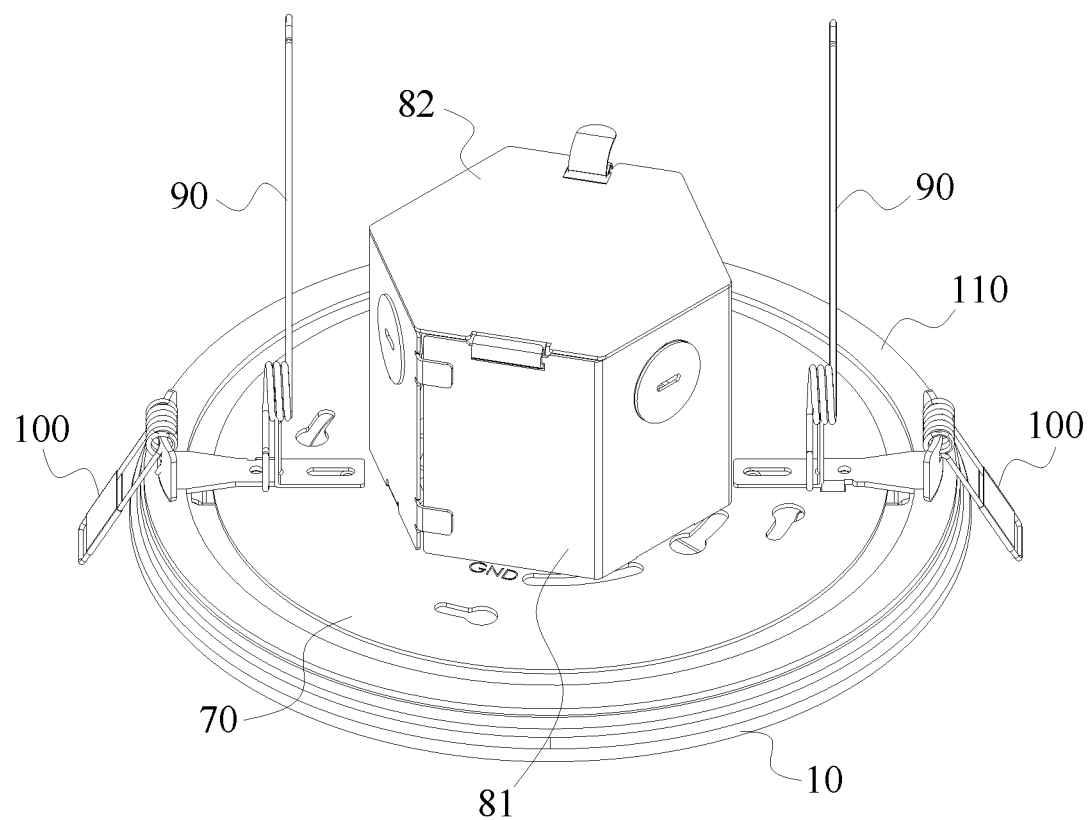
FIG. 2 is a perspective view of a downlight apparatus embodiment.
Figure 3:
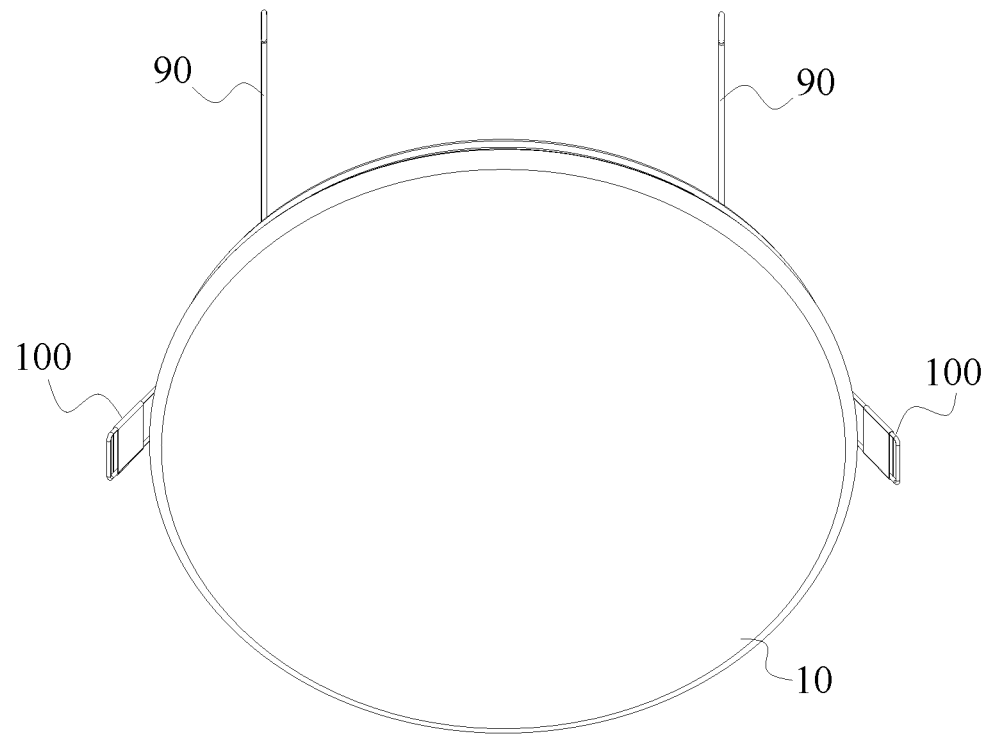
FIG. 3 is another view of the embodiment of FIG. 2.
Figure 4:
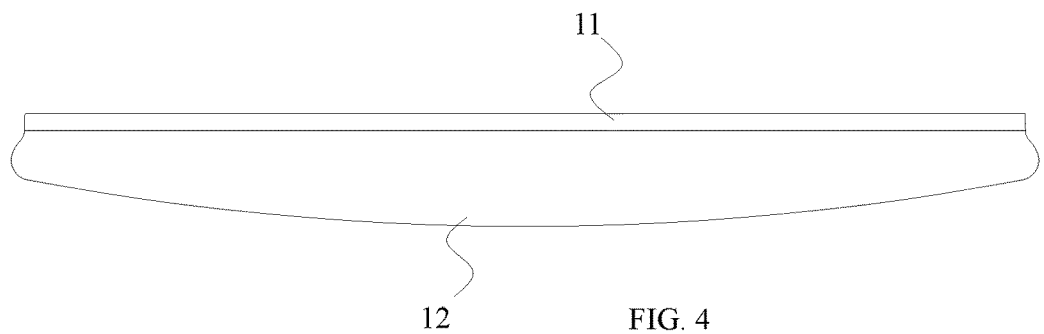
FIG. 4 is another view of the embodiment of FIG. 2.

Please refer to FIG. 1, in an embodiment the light guiding unit 40 and the reflection unit 30 are both at the inside of the heat dissipation unit 20 via a fastener. The light guiding unit 40 and reflection unit 30 are both at the heat dissipation unit 20 via the fastener on the side close to the light passing shell 10. Specifically, the light guiding unit 40 and the reflection unit 30 are both plated through holes, after a part of the fastener pass through the holes on the light guiding unit 40 and the reflection unit 30, they are at the horizontal part 21 on the heat dissipation unit 20. The fastener may be a screw or a rivet.

Figure 7:
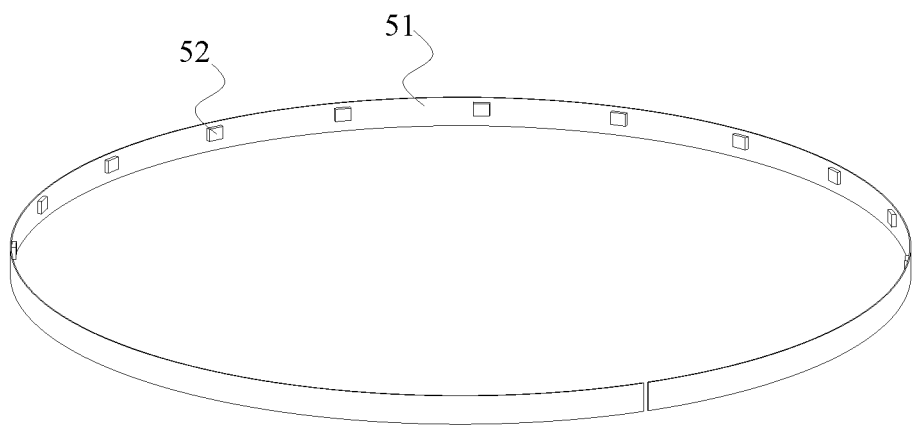
FIG. 7 shows a light source module.
Figure 8:
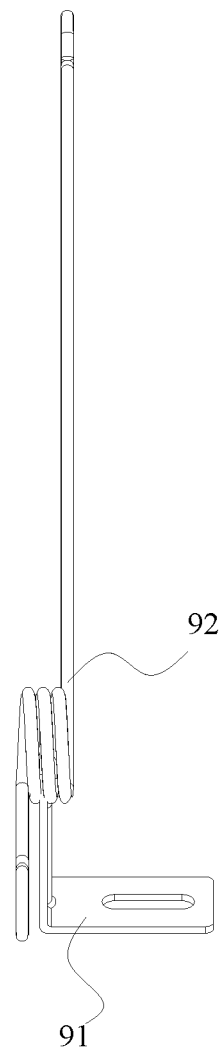
FIG. 8 shows a fixing spring example.
Figure 9:
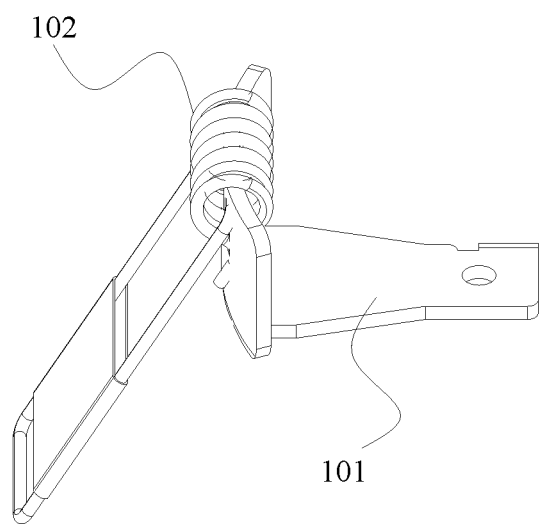
FIG. 9 shows another fixing spring example.

Please refer to FIGS. 1 and 7, the light source module 50 includes a base plate 51 and a LED chip module 52. Among them, the base plate 51 is bound on the inner side wall of the vertical part 22 in the heat dissipation unit 20 via the adhesive. The LED chip module 52 is inside the base plate 51, in addition, the LED chip module 52 are in the base plate 51 on the side far from the vertical part 22. The adhesive may be a double-sided tap, a glue or a heat conductive double-sided tap etc. In an embodiment, the light emitted by the LED chip module 52 derive through the light guiding unit 40, and lead the light transmit toward the light passing shell 10 by the reflection unit 30. The light passing shell 10 transmits the light eventually through the diffusion and the light passing characteristic.

Traditional lighting apparatus has a single function, each lighting apparatus has a color temperature and may not switch between multiple color temperatures. For this reason, In an embodiment, the light source module 50 includes the LED chip module 52, and the number of each kind of LED chip module 52 is even. Specifically, the light source module 50 is mixed with plenty of chip modules, the category and an amount of the LED chip module 52 are multiple such as 4*4, 6*6, 8*8, 10*10, 12*12, 14*14, 16*16 etc. Then via the limiter of the driver module 60 or a toggle switch etc., in order to implement the switch of color temperature. Among them, the model of LED chip module 52 may be 2835, 3030, 5050, 5630, 3014 etc. In an embodiment, the lighting apparatus may be adjusted with different color temperatures via the limiter or the switch, in order to transform the lighting apparatus into multiple color temperatures, increase the useful occasion and diversifying the function.

The way to install traditional lighting apparatus is restricted, it may no longer suitable for new buildings and decorations. For this reason, please refer to FIGS. 1 to 3, FIGS. 8 and 9, the lighting apparatus also includes an installation back plate 70, a fire module 80, a first installation module 90 and a second installation module 100. Among them, the installation back plate 70 is in the shape of a plate, and is on one side of the heat dissipation unit 20 far from the protruding portion 12, and it is outside of the driver module 60. Specifically, avoidable holes are at the center of the installation back plate 70 in order to let the driver module 60 pass through.

The installation of a fire module 80 cover the driver module 60, one part of the fire module 80 is fixed on the installation back plate 70. Specifically, the fire module 80 is made of metal and plastic material that comply with safe standard, which may replace the traditional installation tube in North America. The fire module includes main portion 81 and cover plate 82. The main portion 81 is a hollow structure, which is on the outside of the driver module 60, one of its part is on the installation back plate 70. It may specifically be on the installation back plate 70 via the fastener, which may be a screw or a rivet. The cross section of main portion 81 may be hexagonal or round.

The first installation module 90 is installed on the installation back plate 70, facing to each other at the opposite side on the fire module 80. Specifically, the first installation module 90 is on two opposite sides of the main portion 81 of the fire module 80 including the first shrapnel 91 and the first spring 92. The first shrapnel 91 is approximately in the shape of L, one of the ends is fixed on the installation back plate 70 via the fastener, which may be a screw or a rivet etc. The first spring 92 is on the other side of the first shrapnel 91, and the first spring 92 is fastened with the first shrapnel 91 via a hook.

The second installation module 100 is installed on the installation back plate 70 and is on the outside of the first installation module 90. Specifically, the second installation module 100 is installed on the two opposite sides of the main portion 81 of the fire module 80, and it is located on the outside of the first installation module 90. The second installation module 100 includes the second shrapnel 101 and the second spring 102. The second shrapnel 101 is in the shape of L, one of the ends is on the installation back plate 70 via the fastener, which may be a screw or a rivet etc. The second spring 102 is on the other side of the second shrapnel 101, the second spring 102 is fastened with the second shrapnel 101 via a hook.

In an embodiment, the lighting apparatus may be installed in the ceiling via the second installation module 100. When the fire module is removed, it may be used in standard tubes in North America via the first installation module 90, in order to implement multi-functional use. In addition, the lighting apparatus in an embodiment may be applied not only to the North American market, but also applied to European market. It may be equipped with both European standard spring and North American shrapnel or springs, implementing various ways to install. Furthermore, the lighting apparatus in an embodiment also includes foam 110 which is in the shape of ring, it is installed on the outside of heat dissipation unit 20 and is clamped via the second shrapnel 101.

Please refer to FIG. 1, a driver module 60 includes a back cover 61, a driver circuit board 62 and a front cover 63. Among them, the back cover 61 is fixedly connected to a heat dissipation unit 20, specifically it may be fixed on the heat dissipation unit 20 by the fastener which may be a screw or a rivet. The river circuit board 62 is on back cover 61, the front cover 63 is on the outside of the driver circuit board 62, and it is fixedly connected to the back cover 61. It may specifically be fixed on the back cover 61 with the fastener, which may be a screw or a rivet. In an embodiment, a third shrapnel 120 is between the back cover 61 and the heat dissipation unit 20. The back cover 61, the third shrapnel 120 and the heat dissipation unit 20 are fixed together with the fastener. In addition, a limit structure that the restrict driver circuit board 62 has not installed on the back cover 61 yet.

Preferably, the intelligent control module is installed on the driver circuit board 62. The intelligent control module implements the switch between multiple color temperatures, the switch of the lighting and also plays a role in dimming. It may be implemented by one of the following options: WIFI, IrDA, ZigBee. Specifically, a switch or a limiter is installed on driver circuit board 62, so is an intelligent card. It is provided with vertical drive board 62 and connected with welding, in order to implement the conduction of photoelectric signal. Among them, an intelligent card includes an internal and an external antenna, which may be input by a wireless signal and output in digital or analog to implement uni-control or uses other kind of outputs to implement different functions of lighting apparatus, such as dimming, toning or switching etc. The shape of the intelligent card may be square, rectangular, circular or irregular etc.

In summary, in an embodiment, the lighting apparatus possesses at least the following beneficial effects:

First, the light passing shell 10 adopts the design of unibody, including the exterior surface in curved line. The appearance is artistic, the light transmits evenly, the angel of light emission magnifies and the useful occasions of lighting apparatus increase.

Second, the lighting apparatus in an embodiment may be installed not only in the North American tubes as a tube light, it may be declared also as independent lighting apparatus, and has their own fire installation which may be installed in the ceiling directly. It may be used not only in North America but also in Europe, extremely increasing the useful occasion Third, the lighting apparatus in an embodiment overcomes the disadvantages of traditional single lighting apparatus, which has only a kind of color temperature. Its driver module 60 increases CCT or AI intelligent module, its light source module 50 has a mix with LED chip module in multi-color temperature, in order to implement different color temperature switching, dimming and intelligent control. Making the lighting apparatus more intelligent, reducing costs and saving societal resources, in order to implement multiple uses of a lighting apparatus. It also strengthens the product's core competitiveness in the market. Different modules may be assembled with each other, accelerating the process and improve the production efficiency.

The description above is only an optional embodiment, it is not intended to be limited. Any modification, replacement or improvement etc. made within the spirit and principle of an embodiment should be included in the scope of an embodiment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

The invention claimed is:
1. A downlight apparatus, comprising:
a heat dissipation unit having a first diameter;
a light source module having a plurality of LED chips, the light source module being connected to the heat dissipation unit for the heat dissipation unit carrying away heat of the light source module;
a driver module for converting an indoor power to a driving power supplying to the light source module;
a light guiding unit for receiving a light of the light source module, changing light paths of the light; and
a protruding portion having a top portion and an enlarging portion, the top portion having a second diameter matching the first diameter and attached to the heat dissipation unit, the enlarging portion having a third diameter larger than the first diameter and the second diameter, wherein the heat dissipation unit has an inner side wall, the light source module are attached to the inner side wall of the heat dissipation unit, wherein the protruding portion has a curve side profile with a middle portion having a largest diameter than a top portion and a bottom portion, wherein the heat dissipation unit is installed to a downlight installation cavity, wherein the heat dissipation unit has two elastic structure for fixing the downlight apparatus in the installation cavity, wherein the protruding portion conceals the installation cavity, wherein the light guiding unit is a light guiding plate having a lateral side, a front side and a back side, the light emitted from the light source module enters the lateral side of the light guiding plate and exits from the front side of the light guiding plate and then enters the protruding portion, wherein the light guiding unit is a lens module for guiding the light of the plurality of LED chips evenly to the protruding portion, wherein the lens module has a plurality of lens sets for guiding the light of the light source even to the protruding portion and the protruding portion has a diffusion surface, wherein each lens set is associated with one LED chip, wherein the light source module has a belt, the plurality of LED chips are disposed on the belt, the belt transmits heat of the plurality of LED chips to the heat dissipation unit, wherein there is an elastic buffer between the belt and the heat dissipation unit so that when the light guiding plate is expanded due to thermal expansion, there is a buffer space protecting the light guiding plate and the LED chips.

2. The downlight apparatus of claim 1, wherein the protruding portion having a light diffusion surface for rendering a diffused output light.

3. The downlight apparatus of claim 1, wherein the plurality of LED chips have multiple sets with different tilt angles of light output so as to emit the light to different sections of the protruding portion.

4. The downlight apparatus of claim 1, wherein the heat dissipation unit has a back plate and the driver module is disposed on the back plate.

5. The downlight apparatus of claim 1, wherein the protruding portion has a first part of a first geometric shape and a second part of a second geometric shape, the second part is connected to the heat dissipation unit, the second geometric shape has a different geometric shape than the first geometric shape.

6. The downlight apparatus of claim 1, wherein the plurality of LED chips have a first set of first color temperature and a second set of a second color temperature, the driver module controls the plurality of LED chips to generate mixed lights of different color temperatures.

7. The downlight apparatus of claim 3, wherein a first set of the plurality of LED chips emitting light to a peripheral area of the protruding portion has less LED chips than a second set of the plurality of LED chips emitting light to a central area of the protruding portion.

8. The downlight apparatus of claim 4, wherein the driver module has a metal box engaging the back plate of the heat dissipation unit.

9. The downlight apparatus of claim 8, wherein a back cover has a vertical bar, the metal box has a guiding groove, the vertical bar is inserted into the guiding groove while installing the back cover to the metal box.

10. The downlight apparatus of claim 9, wherein the vertical bar has an elastic hook corresponding to a position structure of the guiding groove so that when the elastic hook is inserted to the position structure, there is an elastic force for firmly engaging the metal box to the back plate of the heat dissipation unit.

* * * * *